United States Patent

McGeorge, Jr. et al.

(10) Patent No.: US 6,795,832 B2
(45) Date of Patent: Sep. 21, 2004

(54) RULE BASED COMPATIBILITY MODULE

(75) Inventors: Vernon E. McGeorge, Jr., San Jose, CA (US); James R. Curtis, Placerville, CA (US); Eric R Soderberg, Mountain View, CA (US); Jonathan Patrizio, San Francisco, CA (US); Morris Lee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 402 days.

(21) Appl. No.: 09/971,581

(22) Filed: Oct. 9, 2001

(65) Prior Publication Data

US 2003/0069696 A1 Apr. 10, 2003

(51) Int. Cl.[7] .......................... G06F 17/30; G06F 15/16
(52) U.S. Cl. .............. 707/203; 707/3; 707/4; 707/5; 707/10; 709/201; 709/217; 709/218; 709/219
(58) Field of Search ............. 707/3–5, 10, 103 R, 707/103 Y, 203; 709/201, 217–219

(56) References Cited

U.S. PATENT DOCUMENTS

| | | | | |
|---|---|---|---|---|
| 5,675,637 A | | 10/1997 | Szlam et al. ................. | 379/142 |
| 5,701,400 A | * | 12/1997 | Amado ......................... | 706/45 |
| 5,715,450 A | * | 2/1998 | Ambrose et al. ........ | 707/103 R |
| 6,014,674 A | | 1/2000 | McCargar .................... | 707/202 |
| 6,484,128 B1 | * | 11/2002 | Sekiya et al. ................ | 702/185 |
| 6,519,767 B1 | * | 2/2003 | Carter et al. ................. | 717/140 |
| 2002/0032694 A1 | * | 3/2002 | Zawadzki et al. ........... | 707/500 |
| 2002/0083213 A1 | * | 6/2002 | Oberstein et al. ........... | 709/313 |
| 2002/0165701 A1 | * | 11/2002 | Lichtenberg et al. ........... | 703/7 |

* cited by examiner

Primary Examiner—Frantz Coby
Assistant Examiner—Haythim J. Alaubaidi

(57) ABSTRACT

A rule based compatibility module provides a single unified mechanism for testing rules where testing results depend on various combinations of database queries, computable values, and/or run-string parameters. The testing results may be evaluated within a particular operational environment. The rule based compatibility module encapsulates all versions of compatibility issues, which are highly dependant on the operational context, into one simple mechanism, thereby reducing risks of unexpected behaviors caused by improper or incomplete handling of compatibility issues. In addition, the rule based compatibility module provides a simple mechanism for handling ad-hoc run-string switches used for debugging, or for optional enabling or disabling of features under development.

6 Claims, 6 Drawing Sheets

RULE BASED COMPATIBILITY MODULE

TECHNICAL FIELD

The technical field relates to database management, and, in particular, to rule based compatibility module.

BACKGROUND

Computers are powerful tools for storing and providing access to vast amounts of information. Computer databases are a common mechanism for storing information on computer systems while providing easy access to users. A typical database is an organized collection of related information stored as "records" having "fields" of information. Between the actual physical databases itself and the users of the system, a database management system is typically provided as a software cushion or layer. In essence, the database management system shields the database user from knowing or even caring about underlying hardware-level details. All requests from users for access to the data are typically processed by the database management system. In other words, the database management system provides users with a conceptual view of the database that is removed from the hardware level.

In database management, maintaining compatibility between different versions of database systems has long being a challenge. Currently, version compatibility issues, which are highly dependent on the operational context, are typically handled by separate ad-hoc solutions. These ad-hoc solutions are typically not integrated and do not interact with each other. Functioning separately, these ad-hoc solutions provide less value to the client programmers. In addition, these separate ad-hoc solutions are typically not verifiable in any rigorous way.

SUMMARY

A method for testing compatibility in a database system includes getting an instance of a rule based compatibility module, getting rules capable of testing compatibility of databases, and evaluating the rules, which returns a value of "true" or "false". The instance depends on an operational environment of the compatibility module. The method further includes executing conditional application code by a client program if the evaluation of the rules returns a value of "true", and executing different conditional application code by the client program if the evaluation of the rules returns a value of "false".

The rule based compatibility module provides a single unified mechanism for testing rules where testing results depend on various combinations of database queries, computable values, and/or run-string parameters. The testing results may be evaluated within a particular operational environment.

DESCRIPTION OF THE DRAWINGS

The preferred embodiments of a ruled based compatibility module will be described in detail with reference to the following figures, in which like numerals refer to like elements, and wherein.

DETAILED DESCRIPTION

A rule based compatibility module provides a single unified mechanism for testing rules where testing results depend on various combinations of database queries, computable values, and/or run-string parameters. The testing results may be evaluated within a particular operational environment. Implemented within a service guard manager (SGM) module, this operational environment may be a connection to a data source against which database queries may be executed, and a constrained set of managed entities, referred to as a scope.

A SGM module provides a visual tool to manage entities, such as service guard, service guard oracle parallel server (OPS) edition, metro cluster, continental clusters, and to maintain high availability (HA). Using the SGM module, operators see color-coded, graphically-intuitive icons to get the big-picture view of multiple clusters so that they can proactively manage the clusters, systems (or nodes), and applications. The SGM module enables operators to quickly identify problems and dependencies with drill-down screens for more than one HA cluster, and enables operators to quickly know service guard status, thus minimizing operator training requirements. System administrators can validate the current service guard cluster, node, and package configuration through visualization. The following describes the rule based compatibility module in connection with the SGM module. However, one skilled in the art will appreciate that the rule based compatibility module can be equally applied to other modules or entities having the same or similar functions.

The interface between the SGM module and the entities listed above may be strongly based on a relational database model, since these entities are typically presented through an application programming interface (API) as a set of relational database tables. Furthermore, the API itself typically connects to these entities through a cluster object manager (COM). Accordingly, information relating to all these entities, including version information specifically, may be available in table form. These information may determine what a user can do based on the versions of the entities involved.

The rule based compatibility module encapsulates compatibility issues relating to different versions of database systems, which are highly dependant on the operational context, into one simple mechanism, thereby reducing risks of unexpected behaviors caused by improper or incomplete handling of compatibility issues. In addition, the rule based compatibility module provides a simple mechanism for handling ad-hoc run-string switches used for debugging, or for optional enabling or disabling of features under development. The rule based compatibility module typically captures run-string flags when a program is started, and stores the run-string flags in local tables defined by the cmpatibility module. The values in these database tables may be tested at any time.

Figure 1:
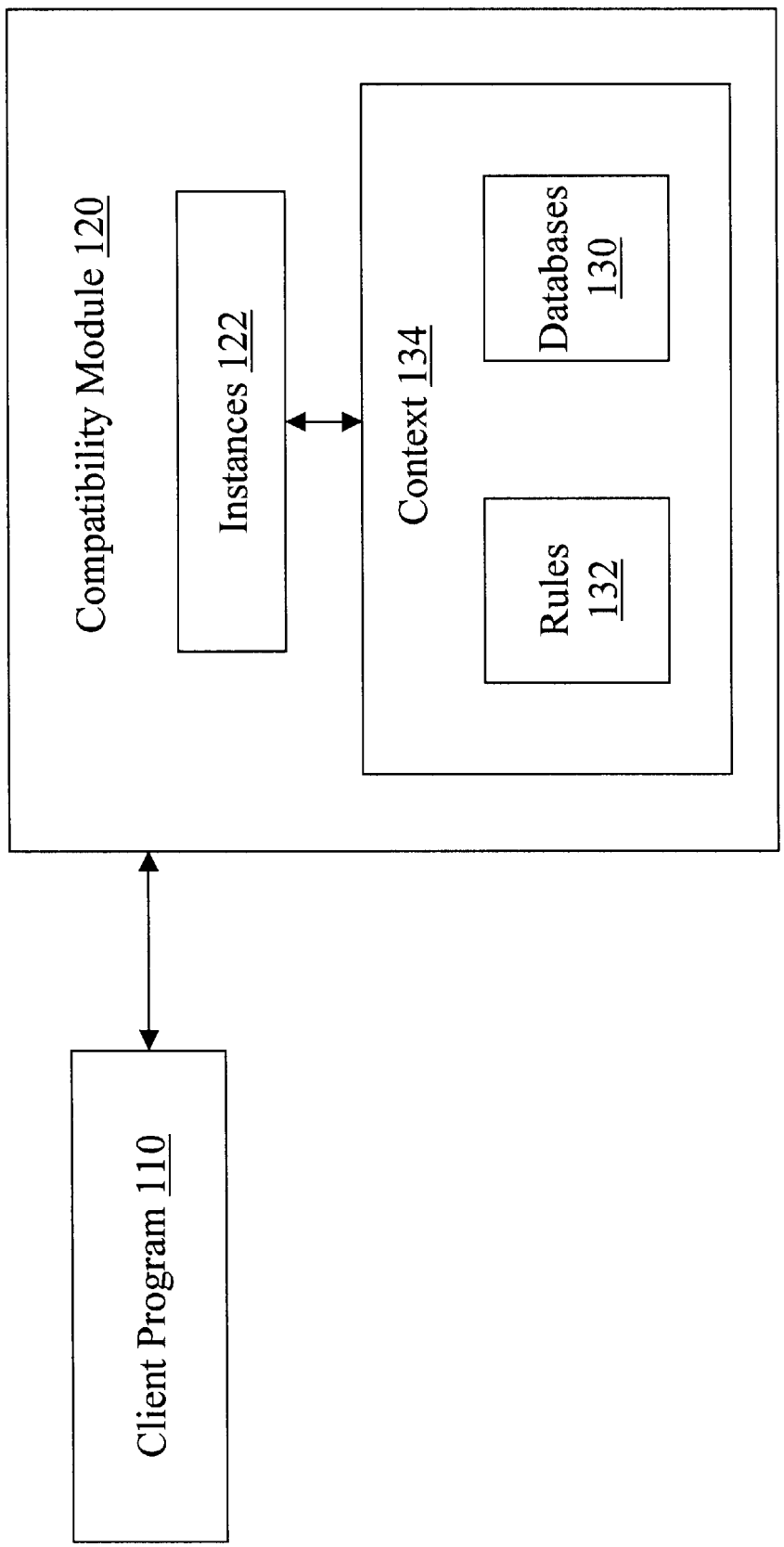
FIG. 1 illustrates an exemplary rule based compatibility module.

FIG. 1 illustrates an exemplary rule based compatibility module 120 and its relationship with a client program 110. The compatibility module 120 may include compatibility module instances 122 and database contexts 134, which may contain rules 132 and databases 130. The databases 130 refer to remote database tables describing the various entities noted above. The remote database tables may be populated via a connection to an object manager as constrained by a scope, i.e. operational environment. A connection to a different server or a change in scope may radically change the database tables visible to a user in the SGM module. The compatibility module 120 typically adds more local tables, referred to as the rules 132, that contain run-sting switches and other miscellaneous values needed by the user. Since the connection and the scope can radically change the database 130, different instances 122 of the compatibility module 120 may need to be created for each combination of the connection and scope used in a program. The instances 122 may interact with the database 130 in a same way as the client program 110. The compatibility module 120 refers to all instances 122, and all codes, schema definition files, and rule definition files that support the functionality of the instances 122. The compatibility module 120 may operate on a database 130 within the context of a particular operational environment, and the result of a query typically depends on the operational environment.

A rule 132 is typically a query against the database 130, specifically against the managed entities of interest to the client program 110, where this query is constructed to return a Boolean "true" or "false" value. The entities of interest are typically accessed via a connection to the database 130 as constrained by the scope. The connection and scope are typically passed to the compatibility module 120 and stored in a database context 134. The database context 134 may be created by the instance 122 of the compatibility module 120 that is returned to the client program 110. When the client program 110 then asks the instance 122 to evaluate a rule 132, the stored values of the connection and scope may allow the instance 122 to access an identical view of the database 130.

A client program 110 typically interacts with one or more databases 130, which may be a database of clusters, notes, and packages. The compatibility module 120 may simplify the task of the client program 110 by eliminating the need for the client program 110 to know internal variations between differing versions of the database 130. For example, the compatibility module 120 may conduct appropriate queries to determine the version of the database 130 and the version of a database schema (described in detail later). With these queries encapsulated in the compatibility module 120, the client program 110 may simply test for certain version specific conditions and respond appropriately.

During a normal operation, the client program 110 typically calls the compatibility module 120 to get an instance 122 based on the operational environment. Because creation of an instance 122 is expensive, the compatibility module 120 may first try to search for a previously created instance 122 through a look up process. If no previously created instance 122 exists, the compatibility module 120 may construct the instance 122 and store the operational environment in the instance 122. Then, the compatibility module 120 may create a database context 134 specific to the operational environment. Once the database context 134 is created, rules schema and rules 132 may be loaded into the database context 134, which may then be stored in the compatibility module instance 122. The rules schema is a file describing local tables in a relational database 130 created by and for the compatibility module. The rule schema typically defines the structure of the tables, such as column names and data types. The rules 132 may be entries in another file that define entries in the database tables defined by the rules schema. The entries may be, for example, a name, how the rule 132 is to be evaluated, and other housekeeping values.

A database table typically contains values, such as names of the rules 132 and the query strings used to evaluate the rules 132. The rules 132 may be coded as query strings or lists of rules to be evaluated. Alternatively, the rules 132 may be coded as a name that can be used to invoke a fragment of a code, to retrieve a value that is not accessible via a table, and to compare that value with another value. Finally, the coded rules may be run and evaluated within the operational environment, and the results may be stored in the database context 134.

The rules 132 may be expressed in structured query language (SQL) or in an implementation programming language, such as Java language or any other programming language. Storing the results of rule evaluation enables programmatic logic to be tested later via queries to the database 130. In addition, the compatibility module instance 122 may be stored in a hashtable used by the look up process, so that instance creation process may be bypassed next time the same instance 122 is needed for the same operational environment. The hashtable is a tool for associating an arbitrary key with an arbitrary value, and is typically used to ensure other processes or other parts of a process can later retrieve the value, if exists. Each unique connection and scope pair may be a unique key.

After the compatibility module instance 122 is returned to the client program, the client program 110 may test the rule 132 by passing the name of the rule 132 to the compatibility module 120. The compatibility module 120 may use a test method to query the database 130 for the rule 132. The test method typically makes a query on a compatibility rules table to get the rule 132, and make additional queries as required to test the rule 132 or to evaluate other rules 132. After evaluating the query, the compatibility module 120 typically returns the resulting value and/or database error to the test method. The test method may return "true" to the client program 110 if the evaluation of the rule 132 results in a true value. All other outcomes, such as missing rules, database errors, or an evaluated false result, may be returned to the client program 110 as "false".

If "true" is returned, a conditional application code may be executed. On the other hand, if "false" is returned, a different conditional application code, or an optional "else" clause, may be executed. For example, if feature X needs to be supported in a database system, i.e., a conditional code needs to be executed, queries needs to be made against the database 130, specifically on tables and/or fields that support feature X. If prior versions of the database do not support these tables and/or fields, and the code is executed unconditionally, an error may be generated. However, before the error is generated, the state of running program and/or the database may have changed in ways that may cause other errors to occur or may be hard to recoup from. By using the compatibility module, a user may test in advance whether the conditional code supporting feature X can be executed. If the conditional code cannot be executed, different conditional code may be executed instead. Alternatively, the user may choose to do nothing and continue with the next block of unconditional code. An unconditional code is a code that will be executed regardless of the condition, either "true" or "false".

The following are additional features and complexities of the rule based compatibility module 120. The client program 110 may capture information in addition to the information in the database 130. For example, when a user logs onto the system, the user may be required to provide the client program 110 with information, such as a user name and a password, that the program 110 may use to create a connection and log onto an object manager or database 130. Since the value of the information may be useful in the evaluation of certain rules 132, a call may be made to this compatibility module 120 to set parameters, i.e., name/value pairs. Later, when a rule 132 is tested, the value may be substituted into query strings before the rule 132 is evaluated.

In addition, the compatibility module 120 may contain rules 132 that permit the user to change or perform certain administrative tasks. The compatibility module 120 may also associate a set of parameters with each operational environment. Each operational environment may be associated with a unique instance 122 of the compatibility module 120, and each such instance 122 typically has its own parameter table. In the SGM module implementation, for example, one of these parameters may be the name of the user creating a connection to a data source.

Additionally, the compatibility module 120 may set the parameters in the program at any point in time, for example, at login time, through an instance 122. Similarly, the client program 110 may retrieve the parameters at a later point through an instance 122 so that additional parameters may be set before testing a rule 132. The parameters may also be incorporated into a rule 132 when parameters are evaluated. In other words, the client program 110 may pass the parameters back to the test method, overriding or augmenting the parameters stored in the instance 122. Additionally, the parameters may be passed into and included in query strings used to evaluate a rule 132. A query string may be passed to a query engine in the database management system (DBMS) or in an API, resulting in a table or an error.

The following is an example of a typically SQL query string:

select count (*)>0 as result from OMSchema where
    OMSchema.name="ServiceGuard" and
    (OMSchema.version="1.3" or
    OMSchema.version>"1.3")

In the example above, the query selects all fields from OMSchema in rows where the name is ServiceGuard, but only if the version is 1.3 or higher. The query then counts the result, which is either 1 row (true) or no row (false).

For rules 132 that do not depend on parameter values, the evaluated results may be cached and returned every time the same query is made. This feature significantly increases performance, because making a query may be relatively expensive. As an example, if a query is made against a rule 132, and the query does not require a parameter, the rule 132 will return the same value regardless of any parameter values. The evaluated result may be cached so that every time the same query is made, the same result may be returned without reevaluating the query.

Additionally, a rule 132 may be constructed to be a composite or list of other rules 132. The following is an example of a rule 132 that is a list of rules 132:

Rules="RuleX AND RuleY NOT RuleZ"

This rule 132 may be evaluated by recursive calls to the compatibility module to test "RuleX", "RuleY" and "RuleZ". Evaluation is from left to right and will cease as soon as a result can be determined. For example, if RuleX is false, RuleY will not be evaluated.

The compatibility module 120 may also construct public rules 132 (whose names are visible to the client program 110 to be tested) from one or more private rules 132 (which are visible only to the compatibility module 120).

In addition, a new instance 122 of compatibility module 120 may be constructed subsequently from another instance 122 of the compatibility module 120 to increase performance. Additionally, an embedded unit test mechanism may be included in the compatibility module 120 to validate all rules 132, thereby providing for a verifiable resolution of compatibility issues during development. For example, if the name of a rule 132 is put on run-strings as an ad-hoc flag, such as Run—TheNameOfMyRule, every time TheNameOfMyRule is tested, details, such as how the rule is evaluated and what the result is, will be logged. By checking these details, the rule 132 may be confirmed as correct or otherwise.

Figure 2:
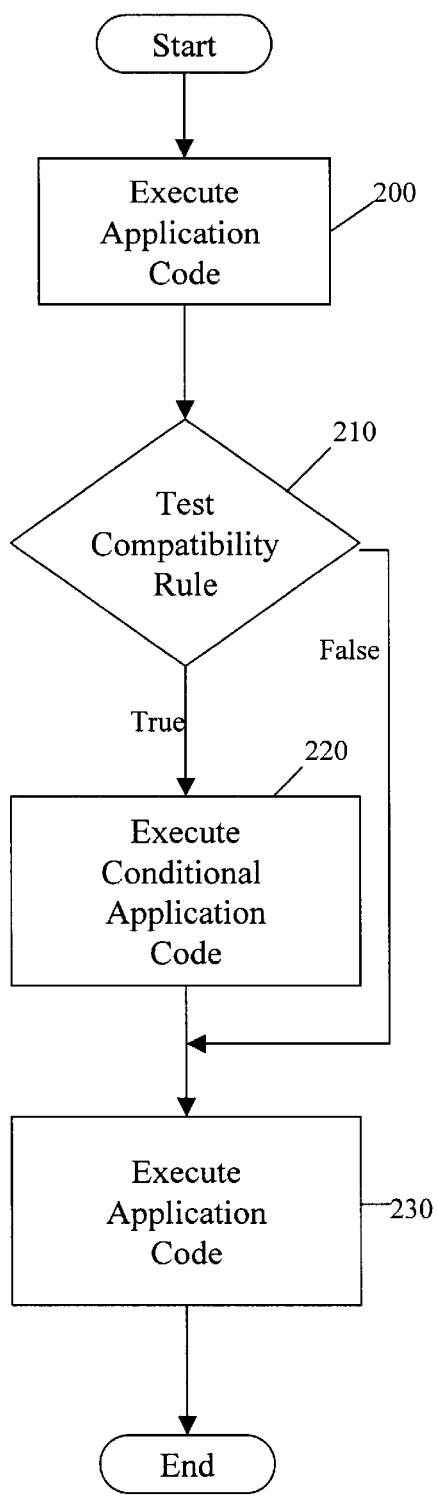
FIGS. 2–6 are flow charts illustrating an exemplary operation of the exemplary rule based compatibility module of FIG. 1.

FIGS. 2–6 are flow charts illustrating exemplary operations of the rule based compatibility module 120. Referring to FIG. 2, the client program 110 first executes an application code, step 200. Next, the compatibility module 120 may test a rule 132, step 210. If the evaluation of the rule returns a value of "true", a conditional application code may be executed by the client program 110, step 220. On the other hand, if a value of "false" is returned, the conditional application code will not be executed by the client program 110, and program execution will continue, step 230.

Figure 3:
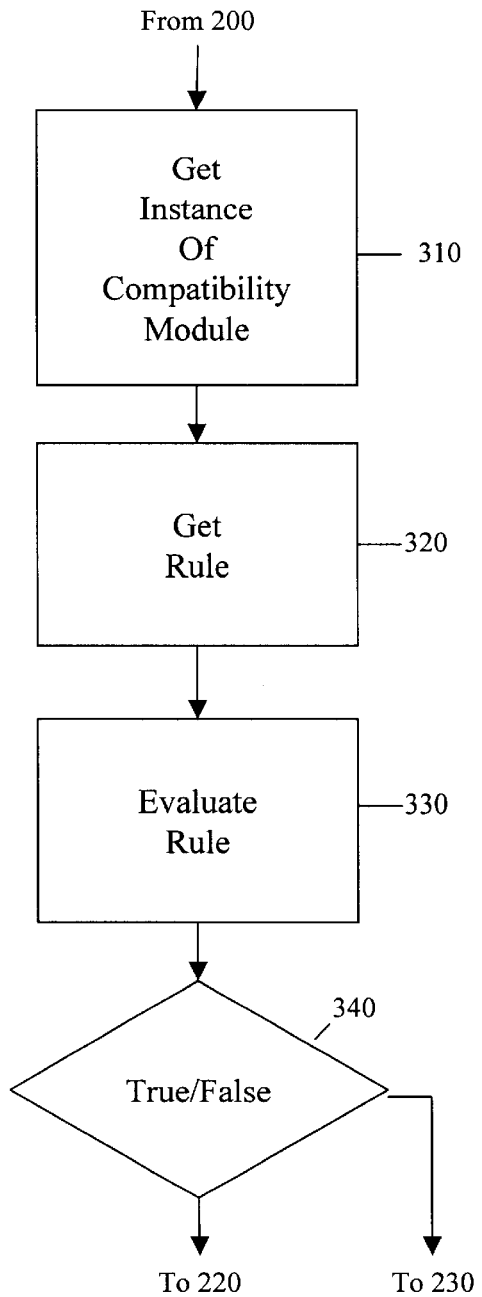

FIG. 3 illustrates details of step 210. The subroutine starts from step 200 of FIG. 2. After the client program 110 calls the compatibility module 120 to get an instance 122 based on a particular operational environment, step 310, the compatibility module 120 gets the rule 132 that is capable of testing the compatibility of databases 130, step 320. Then, the compatibility module 120 evaluate the rule 132, step 330, and returns a value of "true" or "false", step 340. If "true" is returned, the process goes to step 220, whereas if "false" is returned, the process goes to step 230 of FIG. 2.

Figure 4:
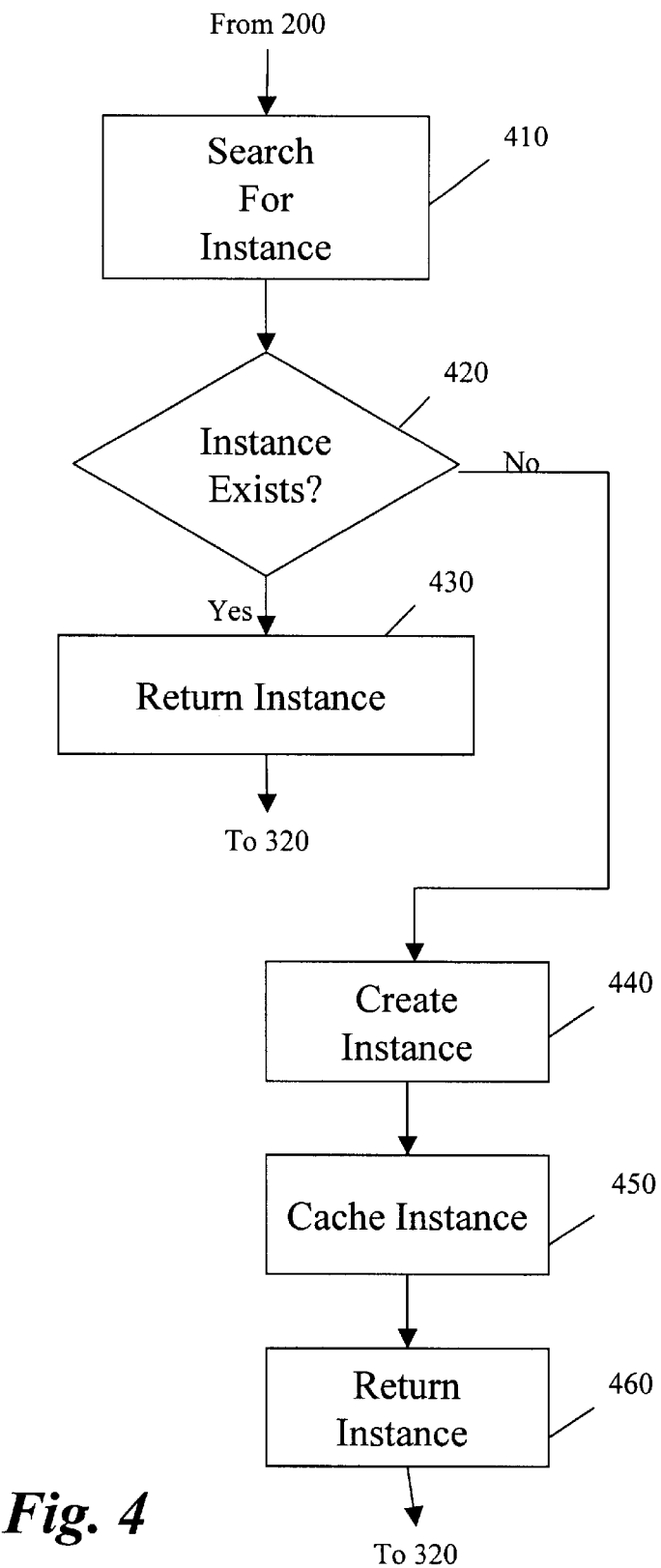

FIG. 4 further illustrates details of step 310. The subroutine starts from step 200 of FIG. 2. Because creation of an instance 122 is expensive, the compatibility module 120 typically first searches for previous created instance 122, step 410. If previous created instance 122 exists, step 420, the compatibility module 120 returns the instance 122, step 430, and the process goes to step 320. If no instance 122 exists, the compatibility module 120 creates the instance 122, step 440, and caches the instance for future use, step 450. Finally, the compatibility module 120 returns the instance 122, step 460, and the process goes to step 320 of FIG. 3.

Figure 5:
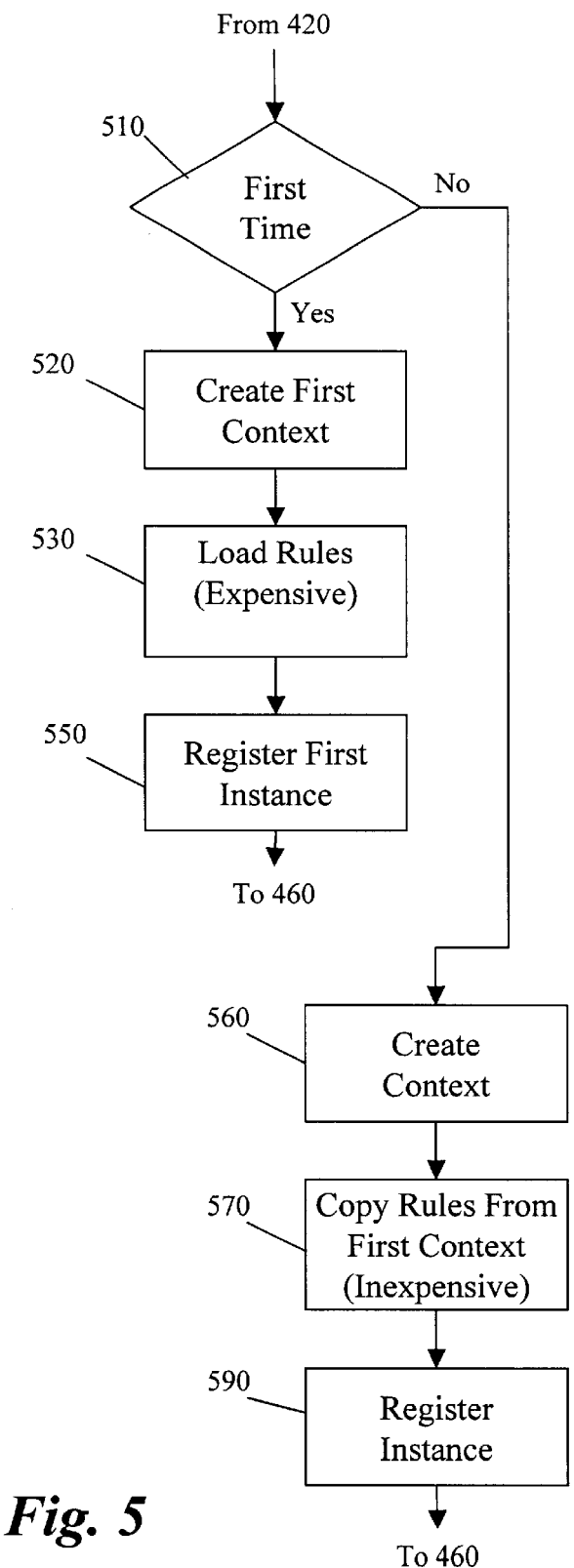

FIG. 5 illustrates details of steps 440 and 450. The subroutine starts from step 420 of FIG. 4. If no prior instance 122 has ever been created, step 510, the compatibility module 120 creates the first database context 134 specific to the operational environment, step 520, and loads the rules 132 into the first database context 134, step 530. Creation of the instance 122 for the first time may be relatively expensive. Thereafter, the first database context 134 may be associated with the instance 122 of the compatibility module 120, and then registered in the compatibility module 120, step 550. Then, the process goes to step 460 of FIG. 4. If, on the other hand, a subsequent instance 122 is created based on the previously created first database context 134, the compatibility module 120 creates the database context 134, step 560, and copies rules 132 from the previously created database context 134, step 570. Finally, the database context 134 may be associated with the instance 122 of the compatibility module 120, and then registered in the compatibility module 120, step 590. Similarly, the process goes to step 460 of FIG. 4.

Figure 6:
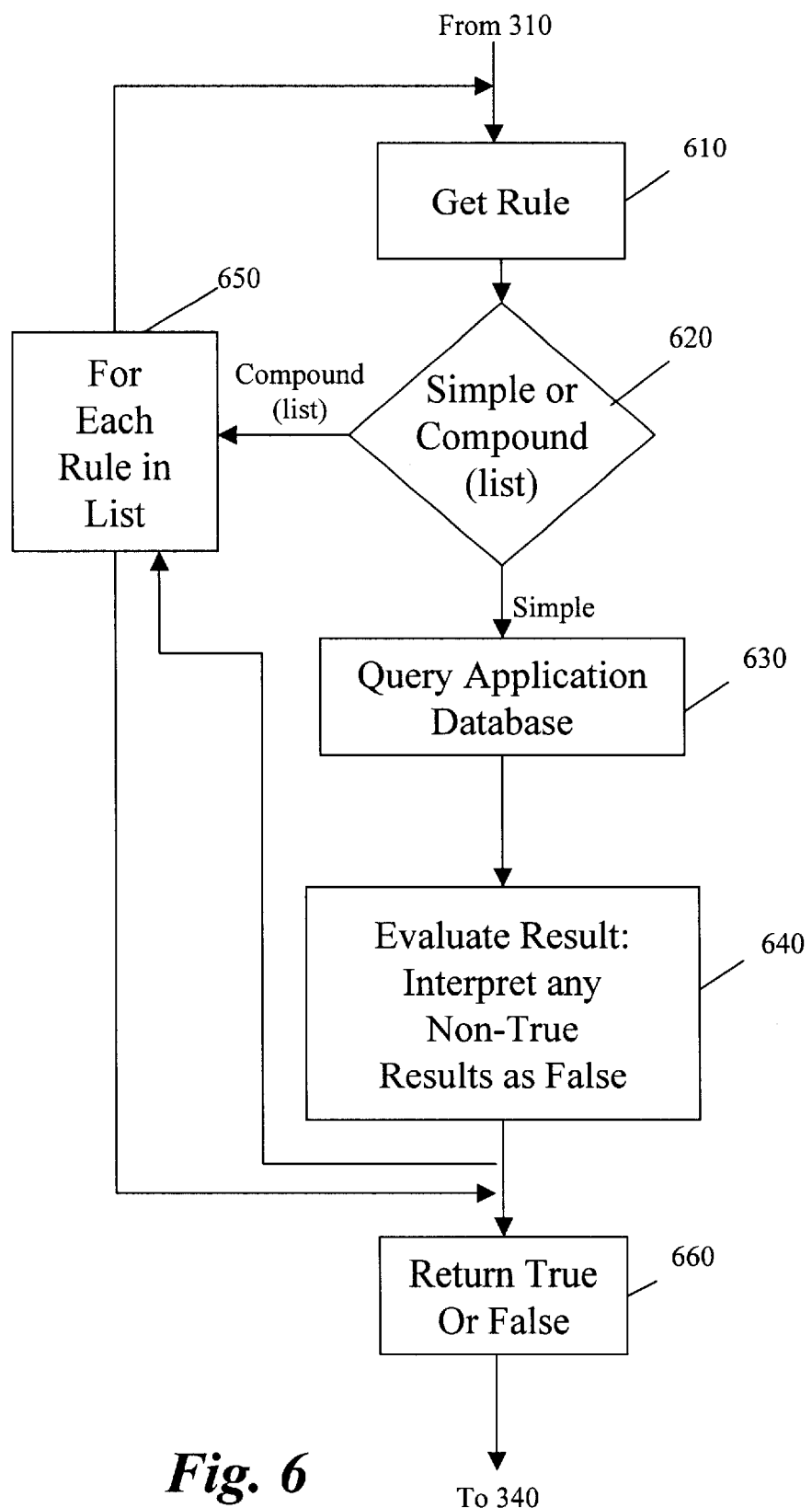

FIG. 6 illustrates details of steps 320 and 330. The subroutine starts from step 310 of FIG. 3. After the compatibility module 120 gets the rule 132, step 610, the rule 132 is evaluated as being simple or compound, step 620. If the rule is simple, the compatibility module 120 queries the database 130 of the specific application, step 630, and interprets any non-true result as "false", step 640. If the rule 132 is a compound rule, containing a list of rules 132, steps 610–640 repeat for each rule 132 in the list, step 650, as needed until the overall "true" or "false" value for the compound rule can be determined. Finally, a value of "true" or "false" is returned, step 660, and the process goes to step 340 of FIG. 3.

Figure 7:
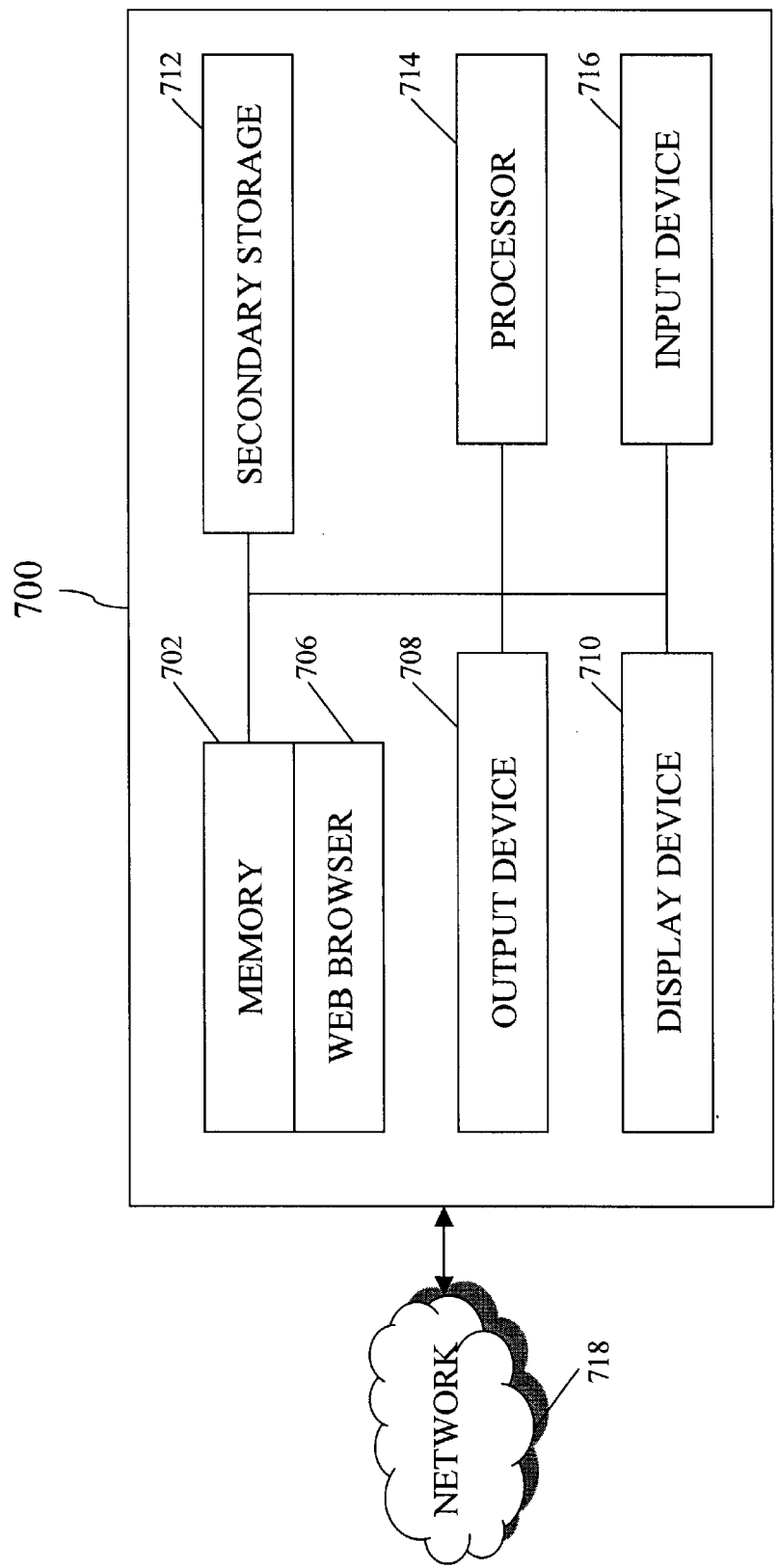
FIG. 7 illustrates exemplary hardware components of a computer that may be used in connection with the exemplary rule based compatibility module of FIG. 1.

FIG. 7 illustrates exemplary hardware components of a computer 700 that may be used in connection with the rule based compatibility module 120. The computer 700 includes a connection with a network 718 such as the Internet or other type of computer or telephone networks. The computer 700 typically includes a memory 702, a secondary storage device 712, a processor 714, an input device 716, a display device 710, and an output device 708.

The memory 702 may include random access memory (RAM) or similar types of memory. The memory 702 may be connected to the network 718 by a web browser 706. The web browser 706 makes a connection by way of the World Wide Web (WWW) to other computers, and receives information from the other computers that is displayed on the computer 700. Information displayed on the computer 700 is typically organized into pages that are constructed using specialized language, such as HTML or XML. The secondary storage device 712 may include a hard disk drive, floppy disk drive, CD-ROM drive, or other types of non-volatile data storage, and may correspond with various databases or other resources. The processor 714 may execute information stored in the memory 702, the secondary storage 712, or received from the Internet or other network 718. The input device 716 may include any device for entering data into the computer 700, such as a keyboard, keypad, cursor-control device, touch-screen (possibly with a stylus), or microphone. The display device 710 may include any type of device for presenting visual image, such as, for example, a computer monitor, flat-screen display, or display panel. The output device 708 may include any type of device for presenting data in hard copy format, such as a printer, and other types of output devices including speakers or any device for providing data in audio form. The computer 700 can possibly include multiple input devices, output devices, and display devices.

Although the computer 700 is depicted with various components, one skilled in the art will appreciate that the computer 700 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 700 to perform a particular method.

While the rule based compatibility module has been described in connection with an exemplary embodiment, those skilled in the art will understand that many modifications in light of these teachings are possible, and this application is intended to cover any variations thereof.

What is claimed is:

1. A method for testing compatibility in a database system, comprising:
    obtaining an instance of a compatibility module, wherein the instance depends on an operational environment of the compatibility module, wherein the obtaining the instance step includes creating the instance for a first time, and the obtaining step comprises:
        creating a first database context specific to the operational environment;
        loading the rules from the database into the first database context;
        associating the first database context with the instance of the compatibility module; and
        registering the first database context in the compatibility module;
    obtaining rules capable of testing compatibility of databases;
    evaluating the rules, wherein the evaluation of the rules returns a value of "true" or "false";
    executing a conditional application code by a client program if the evaluation of the rules returns a value of "true";
    executing a different conditional application code by the client program if the evaluation of the rules returns a value of "false"; and
    if the different conditional code does not exist, executing a next unconditional code.

2. A method for testing compatibility in a database system, comprising:
    obtaining an instance of a compatibility module, wherein the instance depends on an operational environment of the compatibility module, wherein the obtaining the instance step includes subsequently creating the instance, and the obtaining step comprises:
        creating a database context specific to the operational environment;
        copying the rules from a previously created database context;
        associating the previously created database context with the instance of the compatibility module; and
        registering the database context in the compatibility module;
    obtaining rules capable of testing compatibility of databases;
    evaluating the rules, wherein the evaluation of the rules returns a value of "true" or "false";
    executing a conditional application code by a client program if the evaluation of the rules returns a value of "true";
    executing a different conditional application code by the client program if the evaluation of the rules returns a value of "false"; and
    if the different conditional code does not exist, executing a next unconditional code.

3. A method for testing compatibility in a database system, comprising:
    obtaining an instance of a compatibility module, wherein the instance depends on an operational environment of the compatibility module;
    obtaining rules capable of testing compatibility of databases;
    evaluating the rules, wherein the evaluation of the rules returns a value of "true" or "false, " wherein the obtaining the rules and the evaluating the rules steps comprise:
        evaluating the rules as simple or compound, wherein a compound rule contains multiple rules in a list;
        for a simple rule, evaluating the rule by executing a query and interpreting non-true results as "false";
        for the compound rule,
            evaluating each rule in the list;
            returning a value of "true" or "false" for each rule to the compatibility module; and
            evaluating the value of "true" or "false" for each rule; and returning an overall "true" or "false" to the compatibility module;

executing a conditional application code by a client program if the evaluation of the rules returns a value of "true";

executing a different conditional application code by the client program if the evaluation of the rules returns a value of "false"; and if the different conditional code does not exist, executing a next unconditional code.

4. A computer readable medium providing instructions for testing compatibility in a database system, the instructions comprising:

obtaining an instance of a compatibility module, wherein the instance depends on an operational environment of the compatibility module, wherein the instructions for obtaining the instance comprises instructions for:
searching for a previously created instance;
creating the instance if previously created instance does not exist;
caching the instance in the database; and
returning the instance to the compatibility module,
wherein the instructions for creating the instance includes instructions for creating the instance for a first time, and the instructions for creating and caching the rules comprise instructions for:
creating a first database context specific to the operational environment;
loading the rules from the database into the first database context;
associating the first database context with the instance of the compatibility module; and
registering the first database context in the compatibility module;

obtaining rules capable of testing compatibility of databases;

evaluating the rules, wherein the evaluation of the rules returns a value of "true" or "false";

executing a conditional application code by a client program if the evaluation of the rules returns a value of "true"; and executing a different conditional application code by the client program if the evaluation of the rules returns a value of "false".

5. A computer readable medium providing instructions for testing compatibility in a database system, the instructions comprising:

obtaining an instance of a compatibility module, wherein the instance depends on an operational environment of the compatibility module, wherein the instructions for obtaining the instance comprises instructions for:
searching for a previously created instance;
creating the instance if previously created instance does not exist;
caching the instance in the database; and
returning the instance to the compatibility module,
wherein the instructions for creating the instance includes instructions for subsequently creating the instance, and the instructions for creating and caching the rules comprise instructions for:
creating a database context specific to the operational environment;
copying the rules from a previously created database context;
associating the previously created database context with the instance of the compatibility module; and
registering the database context in the compatibility module;

obtaining rules capable of testing compatibility of databases;

evaluating the rules, wherein the evaluation of the rules returns a value of "true" or "false";

executing a conditional application code by a client program if the evaluation of the rules returns a value of "true"; and executing a different conditional application code by the client program if the evaluation of the rules returns a value of "false".

6. A computer readable medium providing instructions for testing compatibility in a database system, the instructions comprising:

obtaining an instance of a compatibility module, wherein the instance depends on an operational environment of the compatibility module;

obtaining rules capable of testing compatibility of databases;

evaluating the rules, wherein the evaluation of the rules returns a value of "true" or "false," wherein the instructions for obtaining the rules and evaluating the rules comprise instructions for:
evaluating the rules as simple or compound, wherein a compound rule contains multiple rules in a list;
for a simple rule, evaluating the rule by interpreting non-true results as "false";
for the compound rule,
evaluating each rule in the list;
returning a value of "true" or "false" for each rule to the compatibility module; and
evaluating the value of "true" or "false" for each rule; and
returning an overall "true" or "false" to the compatibility module;

executing a conditional application code by a client program if the evaluation of the rules returns a value of "true"; and executing a different conditional application code by the client program if the evaluation of the rules returns a value of "false."

* * * * *